United States Patent [19]
van der Kuur

[11] Patent Number: 5,123,175
[45] Date of Patent: Jun. 23, 1992

[54] HORIZONTAL EXTENSOMETER

[75] Inventor: John H. van der Kuur, Pembroke, Canada

[73] Assignee: Atomic Energy of Canada Limited, Ottawa

[21] Appl. No.: 691,328

[22] Filed: Apr. 26, 1991

[51] Int. Cl.$^5$ .............................................. G01B 5/30
[52] U.S. Cl. ...................................... 33/789; 33/790; 73/779
[58] Field of Search ................. 33/789, 788, 787, 790; 73/826, 779

[56] References Cited

U.S. PATENT DOCUMENTS

| | | | |
|---|---|---|---|
| 2,578,066 | 12/1951 | Hyde | 33/789 |
| 2,814,883 | 12/1957 | Strimel | 33/789 |

FOREIGN PATENT DOCUMENTS 0289203  4/1928  United Kingdom .................. 33/788

*Primary Examiner*—Robert Raevis
*Assistant Examiner*—George M. Dombroske
*Attorney, Agent, or Firm*—Wallenstein, Wagner & Hattis, Ltd.

[57] ABSTRACT

Disclosed is a horizontal extensometer for measuring strain on specimens in cryogenic to elevated temperatures with zero frictional and activation forces. The extensometer has first and second elongate hollow arms which are adapted to pivot in relation to one another in response to the increase in length of a test specimen when a strain is applied thereto. An increase between the points of attachment on the specimen produces a corresponding decrease in length at the opposite ends of the two arms, thereby producing movement through a standard linear variable differential transformer. A connecting rod which is highly rigid in the Y-axis but readily flexible in the Z and X-axes is adapted to pass through the center of the linear variable differential transformer to a moveable core and produce a measurement of the differential. The extensometer also employs a unique clamping mechanism which substantially reduces error caused by external forces. The extensometer of the present invention has near zero hysteresis.

8 Claims, 3 Drawing Sheets

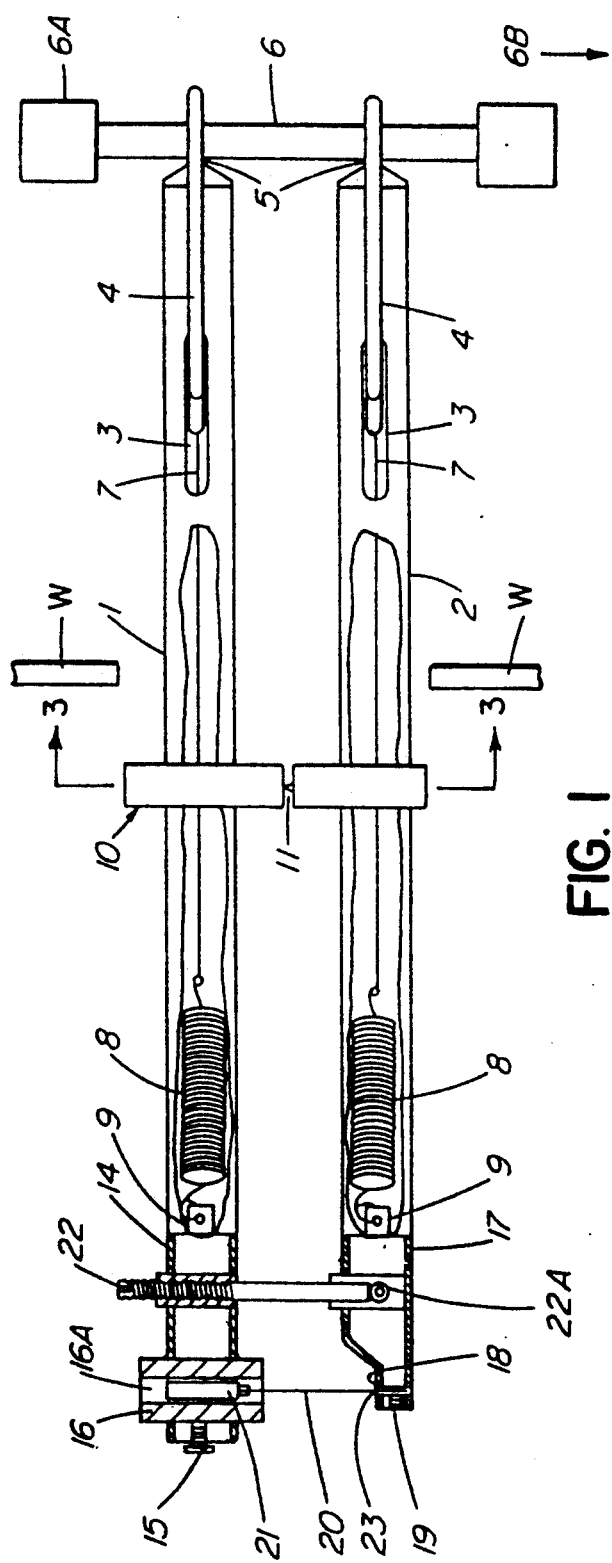

HORIZONTAL EXTENSOMETER

FIELD OF THE INVENTION

This invention relates to extensometers and more particularly, to horizontal extensometers for use in testing specimens in cryogenic to elevated temperatures.

Extensometers measure the change in length, under tension and/or compression of specimens at various temperatures. The goal of extensometer design is to minimize the effect of the extensometer on the specimen under test while accurately responding to the specimen change in dimension. Extensometers must also be convenient to use.

In the design of extensometers, and particularly those which measure test specimens under varying temperatures, it is necessary to provide one portion of the extensometer to attach to the test specimen in a test chamber, while the measurement portion (which may consist of a linear variable differential transformer (L.V.D.T.) or a super linear variable capacitance transducer), remains in a standard room temperature setting.

BACKGROUND OF THE INVENTION

In order to have an instrument which has the test chamber area distanced from the measurement area, two types of extensometers have been developed. These are vertical extensometers and horizontal extensometers. An example of a vertical extensometer is shown in my U.S. Pat. No. 4,848,161, wherein the extensometer is offset to one side of the test specimen, allowing the test specimen strain to be transferred by the extensometer, to its measurement portion, below the test chamber (furnace).

The present invention relates to horizontal extensometers wherein the extensometer arms or clamping mechanism for the specimen are horizontally oriented and the test specimen is placed into the test chamber in a vertical orientation.

Known in the present art are two methods for attachment to the test specimens in horizontal extensometers. The first is to press hinged extension arms against one side of the test specimen. The second is to hold the specimens with offset arms or offset telescoping arms which clamp the specimen by means of a remote spring. The offset arms are combined with a flexural hinge which may, or may not, be part of a transducer.

An example of the first method is found in U.K. patent application published Sep. 7, 1988, under No. GB2201797A. In this particular instrument, hinged extension arms press against the test specimen. Unfortunately, the instrument suffers from a serious disadvantage. It places a bending moment on the test specimen which is undesirable and becomes more undesirable as test temperatures increase.

An example of the second type of extensometer is found in U.S. application Ser. No. 895,642 by John S. Korellis for a CLIP-ON EXTENSOMETER GRIP. This device requires an extensometer with offset arms having significant mass, and inertia, which must be overcome by increased spring force to urge knife edges against the specimen in dynamic testing. The flexural hinge requires an activation force which must be supplied by the tensile test specimen. Again, because of the extreme weight of the instrument and the forces required to be supplied by, and imparted to the tensile specimen, accuracy of measurement is sacrificed.

More recently, it has been found that to overcome the problems caused by the excess forces and weights present in extensometers with offset arms, a linear inline clamping of the test specimen can be used. A spring clamping force is applied so that it creates a very low disturbing moment on the specimen. The clamping force is applied directly diametrically across from the specimen engaging edge of the extensometer.

This type of device is shown in published European patent application No. 84,302,636.0. One of the problems with the clamping mechanism of this device, is that the unitary spring or clip is located within the test chamber and thus subject to the test environment. As such, the clamping force of the spring or clip is reduced with increasing temperature, thus, accurate knife edge location is compromised. Again, accuracy of measurement is sacrificed.

It is an object of the present invention to provide a novel horizontal extensometer which overcomes the measurement accuracy problems of the prior art and which accurately transfers motion to the transducer, with near zero hysteresis.

SUMMARY OF THE INVENTION

The extensometer of the present invention is particularly designed for use with the evaluation of reactor materials for use in nuclear reactors. It measures the ductility of the materials under load and various temperatures.

In the present invention the horizontal extension arms are thin-walled tubing. A slot near the knife edge permits a U-shaped rigid clip to project and contact the specimen directly opposite the knife edge. A wire connects the clip to the activating spring mounted at the opposite end of the tube. The extension arms are pivoted about a single pivot axis which maintains the exact geometric relationship to give an output, exactly proportional to the specimen length change, at the transducer. Motion is transferred to the transducer by a connecting rod which is rigid in its longitudinal Y-axis but which readily accommodates misalignment, by elastic deformation, in the Z and X directions.

Alignment on one axis of the spring, connecting wire, extension arm knife edge, specimen contact point, and U-clip specimen contact point, results in an extensometer with optimum geometric layout. This enables significant reduction in extensometer mass, thus enabling smaller specimen contact forces. The pivot hinge has a single pivot axis located at a predetermined location between said first and second arms. This requires near zero activation force. The pivot hinge may be moved axially along the arms to maximize sensitivity or displacement range. The flexible connecting rod allows for some misalignment in the Z-X plane while minimizing side loading in the transducer due to those misalignments. As a result, frictional forces are near zero. A known transducer which is satisfactory for the present invention is a model 100MHR SCHAEVITZ.

Therefore this invention seeks to provide a horizontal extensometer comprising:
first and second elongated hollow arms, said arms adapted to lie substantially horizontally and parallel in spaced relationship to one another when in a first position; and adapted to pivot in relation to one another about a pivot axis located substantially halfway between first and second ends of said arms;

each of said arms being equipped with a clamping means at said first end, said clamping means being biased towards said second ends of said arms by resilient spring means;

said spring means being located in said hollow arms;

said clamping means being adapted in operation to securely embrace a test specimen between said clamping means and the respective first ends of said arms;

said extensometer further comprising at said second end of one of said arms, an end fitting with an aperture therein;

said aperture being adapted to secure a vertically disposed linear variable differential transformer of a known type;

and said extensometer further comprising at said second end of the other arm a mounting end fitting adapted to fixedly secure one end of a flexible connecting rod;

said connecting rod being rigid with a high modulus of elasticity in its longitudinal axis but being flexible in the two directions perpendicular thereto;

said connecting rod extending substantially vertically from said mounting end fitting through the longitudinal axis of said linear variable differential transformer, and being fixedly attached to a core thereof;

and said extensometer further comprising a gauge length setting means adjacent said second ends of said arms;

said gauge length setting means being adapted to set said arms in substantially parallel relationship in said first position;

wherein in operation, when a test specimen is fixedly held at one end and a downward external force is applied to the opposite end, said specimen increases in length between said clamping means, and said first ends of said first and second arms move away from one another, and pivot about said pivot axis thereby causing a corresponding decrease in the distance between said second ends of said arms; thereby moving said connecting rod and thus said core through said linear variable differential transformer, whereby to produce a measurement signal proportional to said increase in specimen length.

BRIEF DESCRIPTION OF THE DRAWINGS

The following is a description by way of example of one embodiment of the present invention, reference being had to the accompanying drawings in which:

FIG. 1 is an elevational view of the extensometer, drawn to show internal parts;

FIG. 2 is a top view of the clamping mechanism, drawn to show internal parts;

FIG. 3 is a cross-section 3—3 taken along section line 3—3 in FIG. 1;

FIG. 3a is a sectional elevation taken along line 3A—3A in FIG. 3;

FIG. 3b is a section of an alternate hinge mechanism;

DETAILED DESCRIPTION

Figure 4:
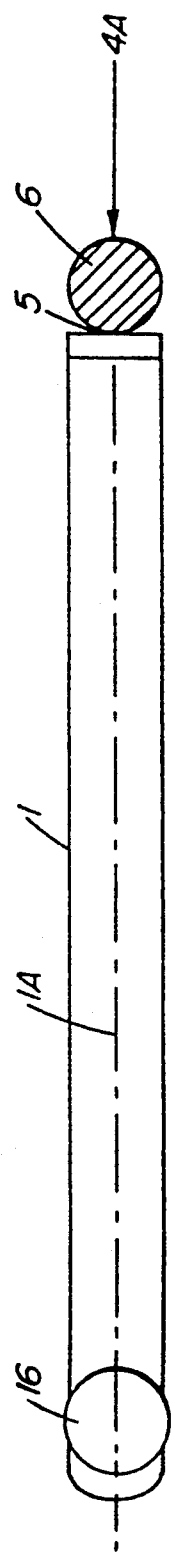
FIG. 4 is a diagrammatic top view of the extensometer.

Turning now to the drawings:

The extensometer is shown in elevation in FIG. 1 with a specimen 6 in place. A hollow tubular upper arm 1 is pivotally connected at 11 to a lower tubular horizontal arm 2 in a manner described hereinafter. Both arms are equipped with slots 3 in which C-clamps 4 (see FIG. 2) are slideably mounted. C-clamps 4 hold the specimen 6 against the knife edges 5 of the horizontal arms. A wire 7 extends from each C-clamp along the longitudinal axis of each of the hollow respective tubular horizontal arms to connect to spring 8. The spring 8 is located away from the area where the specimen is held. The springs 8 are attached to the opposite ends of the horizontal tubular arms by brackets 9.

On the upper tubular horizontal arm 1 is an upper arm aluminum fitting 14 (see also FIGS. 5 & 6) adapted to secure a suitable transducer, in this case a linear variable differential transformer 16 (LVDT). The LVDT is locked in place by means of a set screw 15. The LVDT is equipped with a vertically oriented aperture 16A adapted to receive a core 21 fixed to one end of a flexible connecting rod 20.

On one end of lower tubular horizontal arm 2, opposite the knife edge end 5, is a lower arm aluminum fitting 17. The other end of the flexible connecting rod 20 is attached to projection 18 of lower arm aluminum fitting 17 and is preferably in vertical alignment with the longitudinal axis of LVDT 16. A set screw 19, or epoxy, secures the flexible connecting rod 20 to the lower arm aluminum fitting 17. A gauge setting screw 22 fits through upper arm fitting 14 and lower arm fitting 17 and abuts on stop 22A.

FIG. 2 shows a top view of the upper arm with wire 7 attached to C-clamp 4 securing the specimen 6 against the knife edge 5.

Figure 3C:
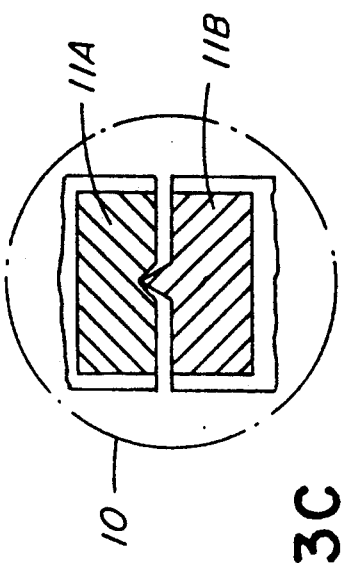
FIG. 3c is an enlarged detail of the hinge shown in FIG. 3A.
Figure 7:
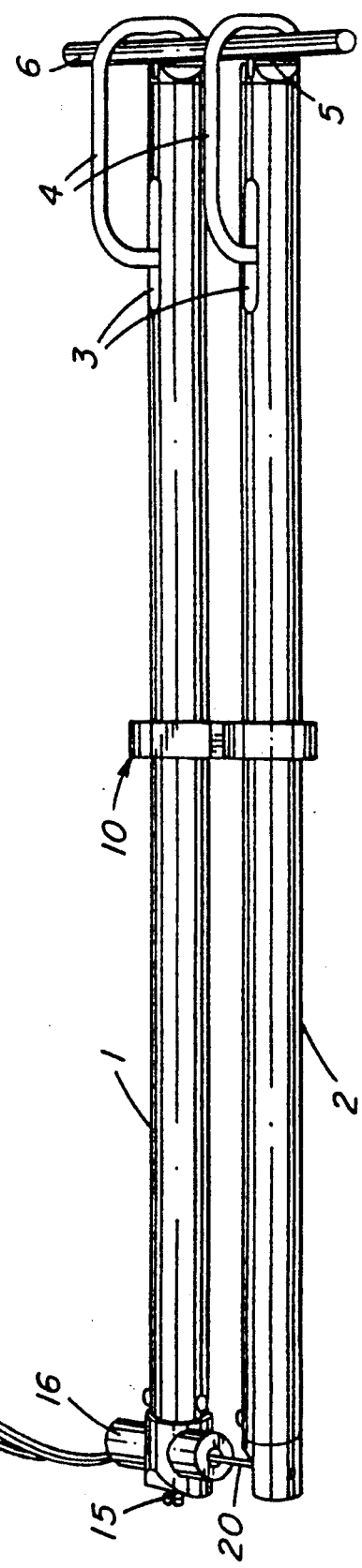
FIG. 7 is a perspective view of the extensometer with a specimen in place.

In FIG. 3 hinge 10 has an upper aperture 12 adapted to hold upper tubular horizontal arm 1 and a lower aperture 13 adapted to hold lower tubular horizontal arm 2. Set screws 12A and 13A secure the respective tubular horizontal arms in pivot hinge 10. Thus, the pivot hinge can be moved along the longitudinal axis of tubular horizontal arms 1 and 2, to accommodate alternative situations.

Hinge 10 must exactly maintain horizontal tubular arms 1, 2 in a fixed geometrical relationship permitting them to pivot about a single pivot axis. This is achieved by the magnetic hinge shown in FIGS. 3, 3A and 3C. A 60° knife edge 11B pivots in a 90° V-groove 11A. 11A is fabricated from a rare earth magnet. 11B is fabricated from a rare earth magnet or ferrous material. 11A and 11B are set into a the hinge body of non ferromagnetic material. Sides of knife edge 11B are ground to give relief from the hinge body when centering knife edge in groove. Side to side sliding of the knife edge in the groove will only result in point contact with hinge body. This hinge maintains the extensometer arms in exact pivotal relationship in the X-Y plane because of: constant contact force between knife edge and V-groove; near zero friction; knife edge and groove are self aligning; and both parts of hinge are strongly held together. These properties also give the extensometer near zero hysteresis.

FIG. 3B shows an alternate precise hinge mechanism wherein a pin 11 pivots in jewelled bearings to maintain the extensometer arms in exact pivotal relationship.

FIG. 4 shows a diagrammatic view of the extensometer when viewed from the top. There is a direct alignment between the clamping force shown as 4A (C-clamp 4 is not shown), the mid-point of specimen 6, the knife edge 5 of the arm 1, and the longitudinal axis 1A of the arm 1. The transducer 16 is normal to the longitudinal axis of arm 1.

Figure 5:
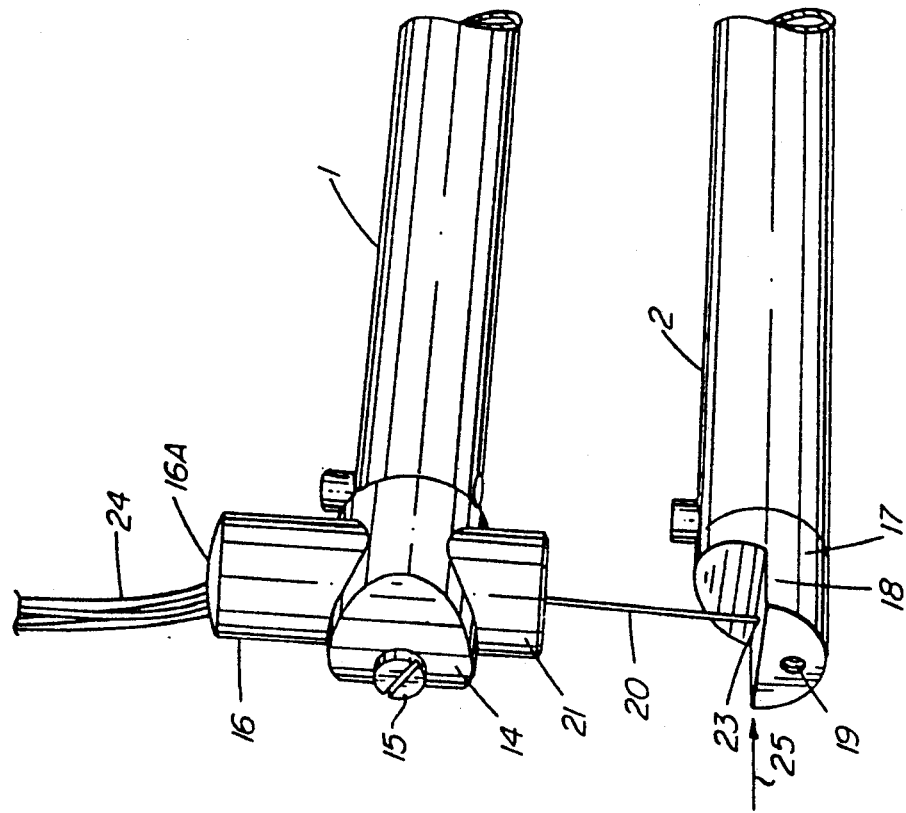
FIG. 5 is a perspective view drawn to a somewhat enlarged scale of one end of the extensometer.

FIG. 5 is a perspective view showing arms 1 and 2 in a typical test starting position. Arms 1 and 2 are substantially horizontal and parallel to one another. In one embodiment of the invention, the connecting rod 20 is shown in near perfect vertical alignment with the longitudinal axis 16A of the transducer 16. Typical wiring leading from the transducer is shown as 24.

Figure 6:
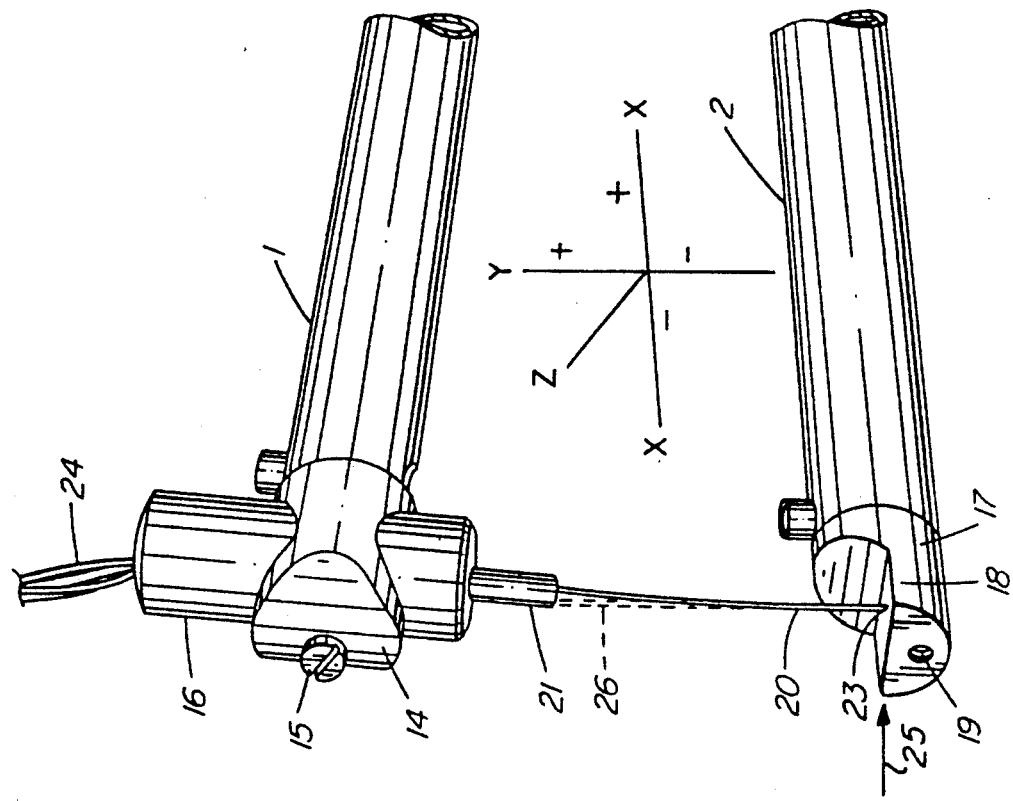
FIG. 6 is a perspective view to the same scale as FIG. 5 showing the device in operation.

In both of FIGS. 5 and 6 set screw 22 is not shown for clarity.

In FIG. 6 there is a slight bending of rod 20. This occurs to some degree whenever arms 1 and 2 are not perfectly parallel. The exact extension of the test specimen is the measured change in the straight line distance 26 between the connecting rod anchorage point 23 and a reference point on the transducer longitudinal axis. Thus it is important to minimize the bend of connecting rod 20. There are two components to this:

Component 1 (vertical position of the hinge)

The connecting rod anchorage point 23 follows an arcuate path as extension arm 2 pivots about 11. The amount that the anchorage point 23 deviates from the straight line ideal path depends on the vertical location of the pivot point 11. The pivot point 11 is ideally located a vertical distance above the anchorage point 23 equal to the maximum distance the anchorage point moves divided by two. In this preferred configuration, as a test proceeds, the anchorage point initially is displaced from the ideal in the negative X direction, passing through 0 at mid test and being displaced in the positive X direction during the last half of the test.

Component 2 (mounting angle of connecting rod)

At the start of the test connecting rod 20 and longitudinal axis of the transducer are all on the same axis. At the end of the test there will be an angle between the two, equal to the angle between horizontal arm 1 and 2. This is a bending of connecting rod 20, FIG. 6. To minimize this error the connecting rod is mounted at a negative angle to the Y axis in the X-Y plane $\phi/2$. $\phi$ is the maximum angle between horizontal arms 1 and 2.

Accuracy at large displacement ranges

Traditionally, linearity of the electronic output of measuring components has been very important. The linearity of this instrument decreases with range, particularly, when the hinge 10 is located near the transducer. However, the transducer output is extremely reproducible. With modern computer technology a correction factor can be applied, and accuracy is retained at large displacement ranges.

Although every attempt is made to make the pivot hinge 10 confine extension arm movement only to the X-Y plane, normal manufacturing tolerances and specimen bending can, on occasion, permit undesirable motion in the Z direction with the result that it would not be uncommon to expect some flexure in the Z-axis of the connecting rod. This however is minimal and is compensated for by the connecting rod being readily flexible in the Z direction.

In operation, as shown in FIG. 1, the right end of the extensometer, on which is clamped the test specimen, is placed in the test chamber in a known manner. The outside wall of the test chamber is indicated by W. The left side is outside the test chamber. The extensometer knife edges 5 are positioned abutting the specimen 6 a fixed distance apart. This is known as the gauge length. Extensometer arms 1 and 2 are substantially parallel in this condition. Set clamps 4 are pulled outwardly from the knife edge and the specimen 6 is inserted in a clamping relationship. Gauge length set screw 22 abuts stop pin 22A to set the gauge length when second ends of arms are brought together. Thereafter stop pin 22A is removed and the extensometer is ready for test. The gauge length can be changed by adjusting set screw 22. Wires 24 are attached to a typical measurement readout device (not shown). Specimen 6 is held in a constant position at point 6A and thereafter a downward force 6B is exerted on the specimen. As the force is increased, typically an elongation of the specimen 6 between the respective clamps 4 and knife edges 5 occurs. Lower tubular horizontal arm 2 pivots in relation to upper tubular horizontal arm 1 about the horizontal pin 11 thereby producing a relative responsive movement of the opposite ends of arms 1 and 2, causing core 21, attached to flexible connecting rod 20, to move upwardly or downwardly within LVDT 16. The movement of the core 2, through the transducer 16, reproduces an analog signal representative of an accurate measurement of the elongation of specimen 6.

In one embodiment pivot pin 11 must be equidistant between knife edges 5 and flexible connecting rod 20. Pivot hinge 10 can be moved in either direction along arms 1 and 2, to accommodate different measuring ranges.

As it will appear to one skilled in the art, the frictional forces in this particular extensometer are minimal and the reading obtained is extremely accurate.

It is to be understood that various modifications of the present invention can be made without departing from the spirit of the present invention.

What I claim is:

1. A horizontal extensometer comprising:

first and second elongated hollow arms, said arms adapted to lie substantially horizontally and parallel in spaced relationship to one another when in a first position; and adapted to pivot in relation to one another about a pivot axis located between first and second ends of said arms;

each of said arms being equipped with a clamping means at said first end, said clamping means being biased towards said second ends of said arms by resilient spring means;

said spring means being located in said hollow arms;

said clamping means being adapted in operation to securely embrace a test specimen between said clamping means and the respective first ends of said arms;

said extensometer further comprising at said second end of one of said arms, an end fitting with an aperture therein;

said aperture being adapted to secure a vertically disposed linear variable differential transformer of a known type;

and said extensometer further comprising at said second end of the other arm a mounting end fitting adapted to fixedly secure one end of a flexible connecting rod;

said connecting rod being rigid with a high modulus of elasticity in its longitudinal axis but being flexible in the two directions perpendicular thereto;

said connecting rod extending substantially vertically from said mounting end fitting through the longitudinal axis of said linear variable differential transformer and being fixedly attached to a core thereof;

and said extensometer further comprising a gauge length setting means adjacent said second ends of said arms;

said gauge length setting means being adapted to set said arms in substantially parallel relationship in said first position;

wherein in operation, when a test specimen is fixedly held at one end and a downward external force is applied to the other end, said specimen increases in length between said clamping means, and said first ends of said first and second arms move away from one another, and pivot about said pivot axis thereby causing a corresponding decrease in the distance between said second ends of said arms; thereby moving said connecting rod and thus said core, through said linear variable differential transformer, whereby to produce a measurement signal proportional to said increase in specimen length.

2. An extensometer as claimed in claim 1 wherein said first ends of said arms include a knife edge;

and said clamping means are substantially elongate C-shaped clamps, said clamps being movable within slots in said hollow arms aligned with the longitudinal axis of said arms such that when in operation forces required to secure said specimen to said extensometer are directly aligned with the longitudinal axes of said arms.

3. An extensometer as claimed in claim 1 wherein said pivot axis is closer to said first ends than to said second ends.

4. An extensometer as claimed in claim 1 wherein said pivot axis is closer to said second ends than to said first ends.

5. An extensometer as claimed in claim 1 wherein the said pivot axis in operation is located a distance vertically above an anchorage point of said connecting rod, said distance being equal to a maximum range of movement of said anchorage point divided by 2.

6. An extensometer as claimed in claim 1 or 2 wherein said connecting rod in said first position is not parallel to the longitudinal axis of the linear variable differential transformer; however, when in operation, as the distance decreases between the second ends of said first and second arms, the angle between the longitudinal axis of said connecting wire and the longitudinal axis of said LVDT approaches zero;

and thereafter said axes are angularly displaced in the opposite direction due to the arcuate movement of the second end of said second arm thereby reducing non linearity in measurement.

7. An extensometer as claimed in claim 1 or 2 wherein said pivot axis comprises a pivot hinge; said pivot hinge comprising a knife edge pivoting in a V-groove, of which at least one of said knife edge or said V-groove is fabricated of rare earth magnets.

8. An extensometer as claimed in claim 1 or 2 wherein said pivot axis comprises a pivot hinge; said pivot hinge including a pivot pin mounted in jewelled bearings.

* * * * *